US007930735B2

(12) United States Patent
Vigelette et al.

(10) Patent No.: US 7,930,735 B2
(45) Date of Patent: Apr. 19, 2011

(54) SERVICE MANAGEMENT FRAMEWORK (75) Inventors: George Vigelette, Walworth, NY (US);
Edward Thomas Fraser, Sr., Rush, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1419 days.

(21) Appl. No.: 11/394,905

(22) Filed: Mar. 31, 2006

(65) Prior Publication Data

US 2007/0239730 A1 Oct. 11, 2007

(51) Int. Cl.
*G06F 7/04* (2006.01)
(52) U.S. Cl. .............. 726/6; 726/11; 726/18; 713/168; 713/182; 713/184; 713/186; 709/223
(58) Field of Classification Search .......... 726/4, 8, 726/11, 22–24
See application file for complete search history.

(56) References Cited

U.S. PATENT DOCUMENTS

| 5,991,882 | A  | * | 11/1999 | O'Connell ............... 726/18 |
| 6,973,575 | B2 | * | 12/2005 | Arnold ................... 713/186 |
| 2005/0005132 | A1 | * | 1/2005 | Yantzi ................... 713/184 |
| 2005/0120211 | A1 | * | 6/2005 | Yokoyama .............. 713/168 |
| 2005/0268334 | A1 | * | 12/2005 | Hesselink et al. ........ 726/11 |

FOREIGN PATENT DOCUMENTS

JP 11-212922 8/1999

OTHER PUBLICATIONS

Anonymous, "Anixis Password Reset V1.0 Administrator's Guide," Internet Citation [Online] Feb. 17, 2004, Retrieved from the Internet: URL:http://web.archive.org/web/20040217034522/www.anixis.com/products/apr/features.htm>, [retrieved on Jan. 23, 2006], 37 pages.
PCT/US2007/064508 International Search Report mailed Sep. 12, 2007.
PCT International Preliminary Report on Patentability, PCT US2007/064508, Oct. 9, 2008, pp. 1-7.

\* cited by examiner

*Primary Examiner* — Taghi T Arani
*Assistant Examiner* — Gregory Lane (57) ABSTRACT

Articles and associated methods, systems, and computer program products relate to a service framework to register multiple plug-ins on a client and to provide access to functionality that would otherwise be unavailable to a user until they logged-in. One plug-in module enables an unauthenticated user to interact with a server to initiate a password reset feature from a secure desktop environment on the client. Another plug-in module enables a user to reset cached credentials on a remote client when requesting a password reset from outside of the server's local network. In some implementations, a server may authenticate the user by issuing challenge questions and monitoring the user's responses. A variety of other services may be provided as plug-ins to the client framework. A library of plug-ins may be stored on the server. The server may select plug-ins to send to each client based upon criteria according to business rules.

27 Claims, 5 Drawing Sheets

SERVICE MANAGEMENT FRAMEWORK

TECHNICAL FIELD

Various implementations may relate generally to a framework for services in a client-server environment, and particular implementations may relate to methods for providing services to interact with unauthenticated users from a secure desktop environment.

BACKGROUND

As computing networks have increased in capabilities and features, user demand for access to such networks has grown. In addition, network users may have diverse roles, and each role may call for different types of access to application software and data. For example, users on a typical corporate network may include accountants, engineers, managers, marketing staff, and administrative staff.

Some organizations use computing networks that are structured according to a client-server model. Clients are typically computer workstations or computer terminals that connect to a central server to provide access to users at various points along the network. Some clients may be remote, and may access the network, and thus the server either through a dedicated line or through other networks, such as the public switched telephone network or the Internet, for example. One or more servers on the network may communicate with client workstations to provide access to various applications software, data, or other information.

Furthermore, some client-server networks allow users to access information from clients at local or remote locations. Moreover, such networks may simplify network administration and information management. For example, information may generally be easier to manage (e.g., back-up) from a centralized server than from a large number of client devices.

Network users may need to access some application software that is common to some or all other users. Typically, all network users may be provided access to basic word processing software to access and to edit documents, email software for communication, and a web browser for accessing an intranet or the Internet.

However, access to certain software applications and/or data may be restricted to certain user groups or according to each user's role. For example, accountants may have exclusive access to certain financial data and to accounting software for payroll, billing, and operational financing functions. Upper level managers and network administrators may have access rights to substantially all data available on the network, but may not have ready access to certain software applications, such as engineering drawing or simulation software.

Access to the network may be determined by the information a user provides to authenticate the user's identity to the network. Typical user authentication procedures call for the user to enter a user name and a password to log on to the network from a client workstation on the network. The server may check the user name and password against stored authentication information to determine whether to allow the user to access the network. In some cases, the server may further determine an authorized role for the user, and may also set-up an appropriate configuration profile and access privileges based upon the user's identifying information and authorized role.

SUMMARY

Articles and associated methods, systems, and computer program products relate to a service framework to register multiple plug-ins on a client and to provide access to functionality that would otherwise be unavailable to a user until they logged-in. One plug-in module enables an unauthenticated user to interact with a server to initiate a password reset feature from a secure desktop environment on the client. Another plug-in module enables a user to reset cached credentials on a remote client when requesting a password reset from outside of the server's local network. In some implementations, a server may authenticate the user by issuing challenge questions and monitoring the user's responses. A variety of other services may be provided as plug-ins to the client framework. A library of plug-ins may be stored on the server. The server may select plug-ins to send to each client based upon criteria according to business rules.

Some implementations may provide one or more advantages. For example, some implementations provide for resetting cached credentials for remote and/or telecommuting users so that remote users can log into their machines after a password reset without returning to the office to directly connect to the network. Solution provider costs may be reduced by reducing the amount of support calls to the help desk and resources needed to support such calls. Some implementations may be used to synchronize passwords across multiple systems. Furthermore, some framework implementations may be adapted or scaled to provide additional administrative functions, such as enterprise-wide password resets, for example. Some implementations provide a method to communicate with an unauthenticated user. Implementing services using this framework would increase reliability and security, improve customer satisfaction, while reducing the costs associated with delivering these services.

The details of one or more implementations of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

Figure 1A:
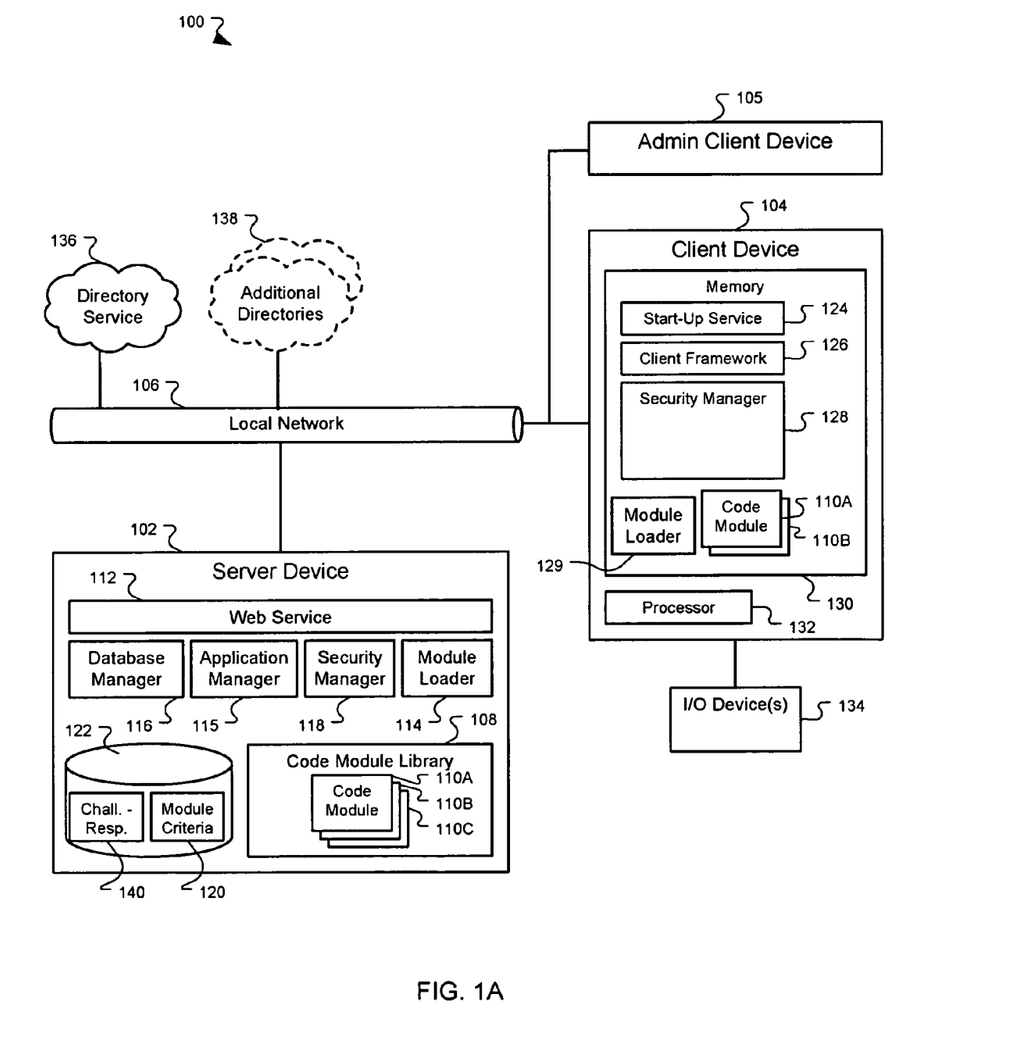
FIG. 1A is a block diagram of an example system for distributing code modules from a server device to a client device.

FIG. 1A shows an example system 100 for distributing code modules from a server device 102 to a client device 104 via a network 106. Particularly, the server device 102 includes a code module library 108 containing code modules 110A, 110B, 110C. The code modules 110 may be service modules that may be registered in a service framework on the client device 104, and may further be dynamically linked libraries and/or plug-ins, for example. In general, the system 100 may include more than one client device. In some implementations, the system 100 includes more than one server device, for example, to balance the load imposed by the client devices on the server devices or to provide fault tolerance among the server devices.

The server device 102 also includes a web service 112, a module loader 114, an application manager 115, a database manager 116, and a security manager 118. The web service 112 provides an interface to users of the client device 104, such as in the form of web pages using the Hypertext Transfer Protocol (HTTP). The web service 112 may also distribute the code modules 110 to the client device 104, such as via HTTP and the Secure Sockets Layer (SSL) and/or the Transport Layer Security (TLS). The module loader 114 may manage registrations and status of third party plug-in modules (e.g., password reset plug-in), such as client or operating system specific password reset plug-ins.

An application manager 115 may cooperate with the module loader 114, and may select code modules from the code module library 108 to install on the client device 104. The application manager 115 may base its selection on identifying information sent from the client device 104 to the server device 102, and/or it may use the identifying information together with module criteria 120 contained in a repository 122 to select code modules to be sent to the client device 104 and registered with the client framework 126.

The module criteria 120 may provide various criteria for selecting code modules to load into the client framework 126 on an individual client, groups or clusters of selected clients, or to all networked client devices. Some selection criteria may base module selection, at least in part, on an operating system being run by each client device, including type, supplier, version, and any installed patches, for example. Some other selection criteria may consider type, version, and capability of available memory, hardware, or software running on the client. Still other criteria may base module selection on each user's role (e.g., accountant, CEO, line manager, engineer, marketing, human resources, etc.). The role associated with each user authenticated to the server 102 or to the operating system on the client 104 may determine what package of modules, if any, are sent to be registered with the client framework 126. These and/or other similar criteria may be combined to select code modules.

For example, the code module library 108 may contain code modules customized based on the language of the users at the client device 104. The identifying information may determine the geographic location and languages used at the client device 104. The module criteria 120 may include the code modules associated with the geographic location and languages used at the client device 104. In another example, each geographic location may be associated with a particular server device from which to download code modules. The module loader 114 may direct the client device 104 to the appropriate server device based on its geographic location (e.g., building), business group, IP address (e.g. subnet), or other parameters, taken singly or in combination. The database manager 116 may provide access to the repository 122. The security manager 118 may verify the authenticity of connections made to the web service 112.

The client device 104 includes a start-up service 124, a client framework 126, a security manager 128, and a loader module 129 within a memory 130. The client device 104 also includes a processor 132 capable of running an operating system (e.g., the Windows operating system from Microsoft Corporation of Washington) processing instructions stored in the memory 130 or on a storage device. The start-up service 124 may initiate the code modules 110 designated to operate at the client device 104. The start-up service 124 may also contact the module loader 108 to receive new or updated code modules or to remove code modules from the client device 104. The security manager 128 may verify the authenticity of code modules received from the server device 102, such as by the use of a cyclic redundancy check (CRC). The module loader 129 may perform operations on the client 104 that are similar to the operations the module loader 114 performs on the server 102. The client framework 126 provides basic services to the code modules 110. The client framework 126 may be, for example, an application program interface (API) providing functions such as encryption and decryption of information sent via the network 106, logging of messages, and access to a security desktop on which the user may be presented with a login to the client device 104. The client device 104 includes one or more input/output (I/O) devices 134. The I/O devices 134 may include, for example, a display where the client device 104 presents a user interface to the user, such as the security desktop display (i.e., login screen), an example of which is described in further detail with reference to FIG. 3.

Code module 110A may be, for example, a password reset module that allows a user to reset his or her network password using the client device 104 without logging into the operating system of the client device 104. The code module 110A may present a user interface element to the user on the security desktop display that allows the user to initiate the password reset process. An application at the server device 102, such as the web service 112 or the security manager 118, may perform operations to authenticate the user and/or the request to reset the password. The web service 112 or a module accessible by the web service 112 may reset the user's password within a directory service 136. In some implementations, the system 100 includes additional directories 138 where the web service 112 may reset additional passwords of the user, such as a password within a backup directory service or a password for separate network.

Code module 110B may be a module that tracks system properties of the client device 104, such as physical and/or virtual memory usage, hard disk usage, applications installed, and application usage. When installed and operating at the client device 104, the code module 110B may report the system properties of the client device 104 to a central location, such as the server device 102, for storage and/or processing. In some implementations, a user may view the system properties using the client device 104 without logging into the client device 104.

Code module 110C may be a ticker service that collects, stores, retrieves, processes, and/or displays information. For example, a ticker service may display information about network service status, including outages, estimated time remaining until outages are removed and services are brought back on line, estimated repair times. One of ordinary skill in the art will recognize other information that can be displayed using such a ticker service.

In this example, the information repository in the server 102 further includes a challenge/response database 140. The challenge response database may contain questions and answers that may be used to verify the identity of an unauthenticated user via the password reset code module 110A, for example, that is loaded on the client 104 and containing instructions to provide that functionality. In other implementations, the database 140 may be outside the server 102, such as on one or more data storage devices that can be accessed by the server 102 via the network 106. Examples of implementations for accessing the challenge/response database 140 are described in further detail with reference to FIG. 1B and FIG. 4.

The system 100 also includes administration client device 105. From the admin client device 105, and IT or network administrator, for example, may monitor utilization of various elements of the framework and infrastructure on the client(s) 104, the server 102, as well as other auxiliary components in the system 100. The device 105 may provide capabilities to control operation of the framework 126, for example, on any or all client devices operated on the network 106. In various examples, which are illustrative and not limiting, the device 105 may be used to maintain, define, or amend business rules, perform application management, and/or accomplish deployments of plug-ins in the system 100.

Figure 1B:
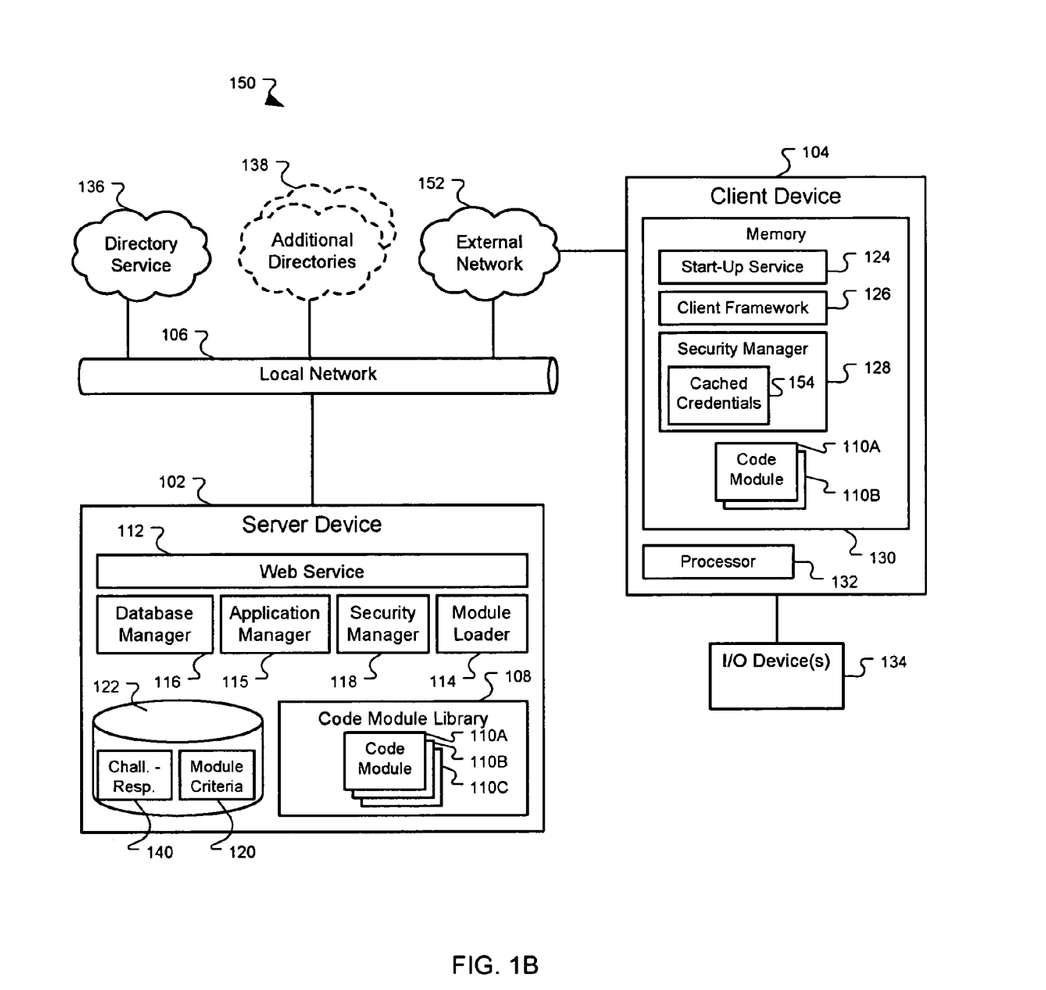
FIG. 1B is a block diagram of an example system for distributing code modules from a server device to a remote client device.

FIG. 1B shows an example system 150 including the client device 104 in communication with the network 106 via an external network 152. In this example, the client device 104 may be a laptop or handheld computer, mobile workstation, portable desktop computer, portable digital assistant, or other processor-based device capable of accessing the local network 106 remotely through the external network 152. The external network 152 may include, for example, any of a wide area network (e.g., the Internet), a virtual private network, a local area network, a public network (e.g., public telephone switched network (PSTN) or plain old telephone system (POTS)), or a combination of these, which may wired (e.g., xDSL), wireless (e.g. cellular), and/or optical (e.g., fiber optic) networks, either individually or in combination.

When client device is remote from the local network 106 and the directory service 136, or otherwise connected, for example, outside of a firewall (not shown) provided between the network 106 and the external network 152, the client device 104 may operate using cached credentials 154. The cached credentials 154 may contain network logins and passwords that have previously been used at the client device 104 to authenticate to the directory service 136 or the additional directories 138. While the client device 104 is operated remotely with respect to the network 106, the cached credentials may be used to login to the client device 104.

To initiate a password reset while operating remotely, the user may activate the code module 110A on the client device 104. The code module 110A may reset the cached credentials 154 in the memory of the client device 104, for example, by appropriately reconfiguring pointers in memory. The code module 110A may use, for example, a login and password provided by the server device 102 or the user of the client device 104 when resetting the cached credentials. An exemplary method for resetting cached credentials is described in further detail with reference to FIG. 4.

Figure 2:
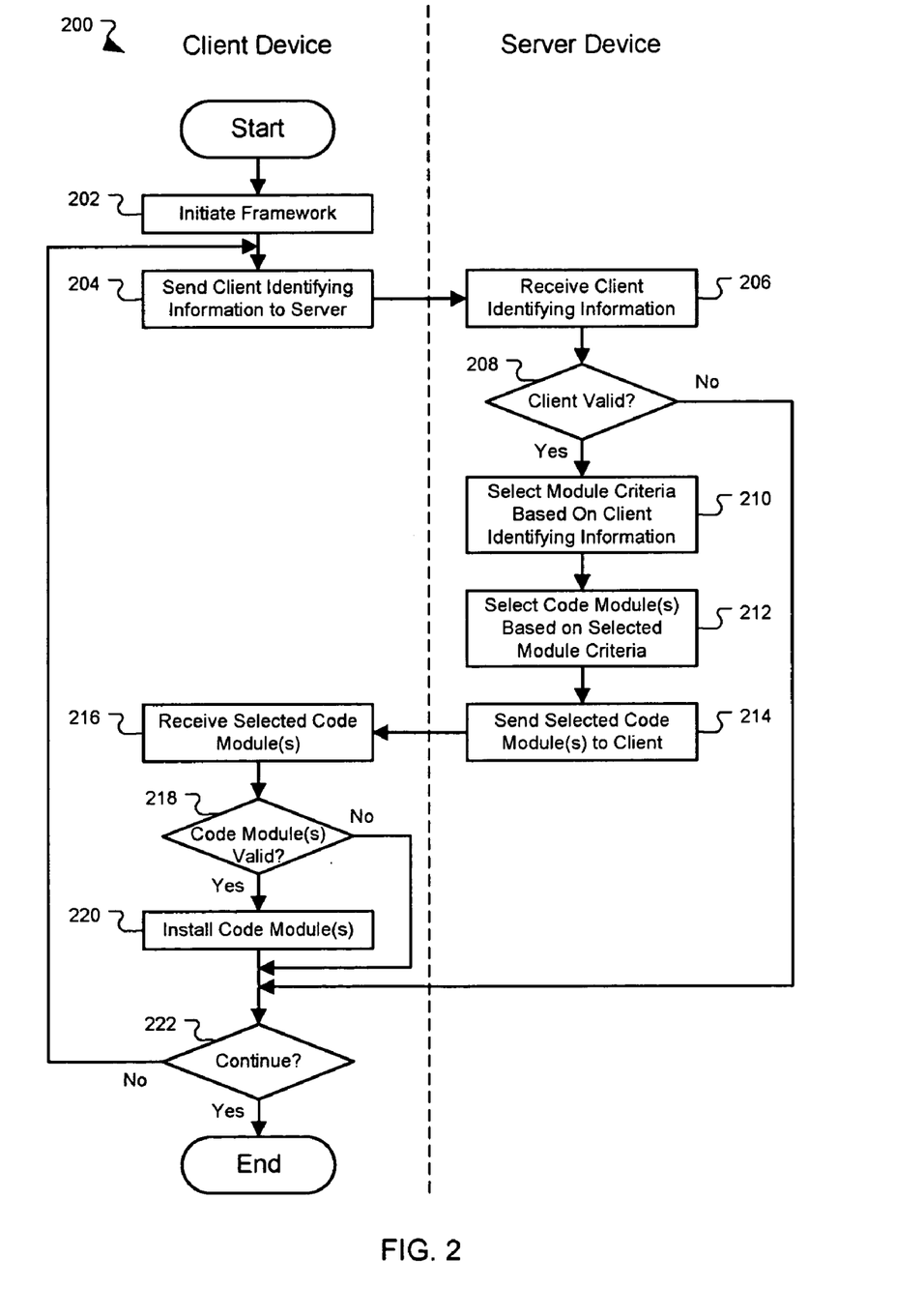
FIG. 2 is a flow chart showing example steps for distributing code modules from a server device to a client device.

FIG. 2 shows an example method 200 of operations for selecting code modules to be installed on the client device 104. The method 200 includes operations that may be performed generally by the system 100. Some or all of the operations may be performed by one or more processors executing instructions tangibly embodied in a signal. The processing may be implemented using analog and/or digital hardware or techniques, either alone or in cooperation with one or more processors executing instructions.

The method 200 begins at step 202, when the client framework 126 is activated. The start-up service 124, for example, may activate or otherwise provide access to the client framework 126. In some implementations, the start-up service 124 may be initiated automatically when then the client device 104 is turned on and no user is authenticated to the operating system of the client 104.

At step 204, identifying information is sent from the client device 104 to the server device 102. In some implementations, the client framework 126 may perform the operation of sending the identifying information. The identifying information may include, for example, the name of the client device 104 and/or the name of the user operating the client device 104. The server device 102 receives, at step 206, the identifying information.

If, at step 208, the server device 102 determines that the client device 104 is allowed to access the code module library 108, then the server device 102 selects the module criteria 120 based on the identifying information, at step 210. In some implementations, the web service 112 may perform the determination and the selection. The module criteria 120 include business rules governing the distribution of the code modules 110 to particular client devices. The business rules may use a business role of the users at the client device 104 to determine code modules to be installed, updated, or removed at the client device 104. For example, a client device operated by a user who is not a network administrator may not include the server device administration code module, while a client device operated by a system administrator may include the server device administration code module.

The server device 102 selects, at step 212, one or more of the code modules 110 based on the selected module criteria 120. In some implementations, the application manager 115 may perform the selection in cooperation with the database manager 116, which may provide access to the module criteria 120 in the repository 122.

The server device 102 sends, at step 214, the one or more selected code modules to the client device 104. The server device 102 may send the code modules via the web service 112. At step 216, the client device 104 receives the selected code modules.

If, at step 218, the client device 104 determines that the received code modules are valid, then the client device 104 installs the received code modules at step 220. Determining that the code modules are valid may include operations such as decrypting the received code modules, performing a CRC (cyclical redundancy check) on the received code modules, and/or verifying a digital signature submitted with the received code modules.

If, at step 218, the received code modules are not valid, or if, at step 208, the client is not valid, then, at step 222, the method 200 may either continue or end. If, for example, updates have been made to the code module library 108 and/or the module criteria 120, then step 204 is repeated. Otherwise, the method ends.

Figure 3:
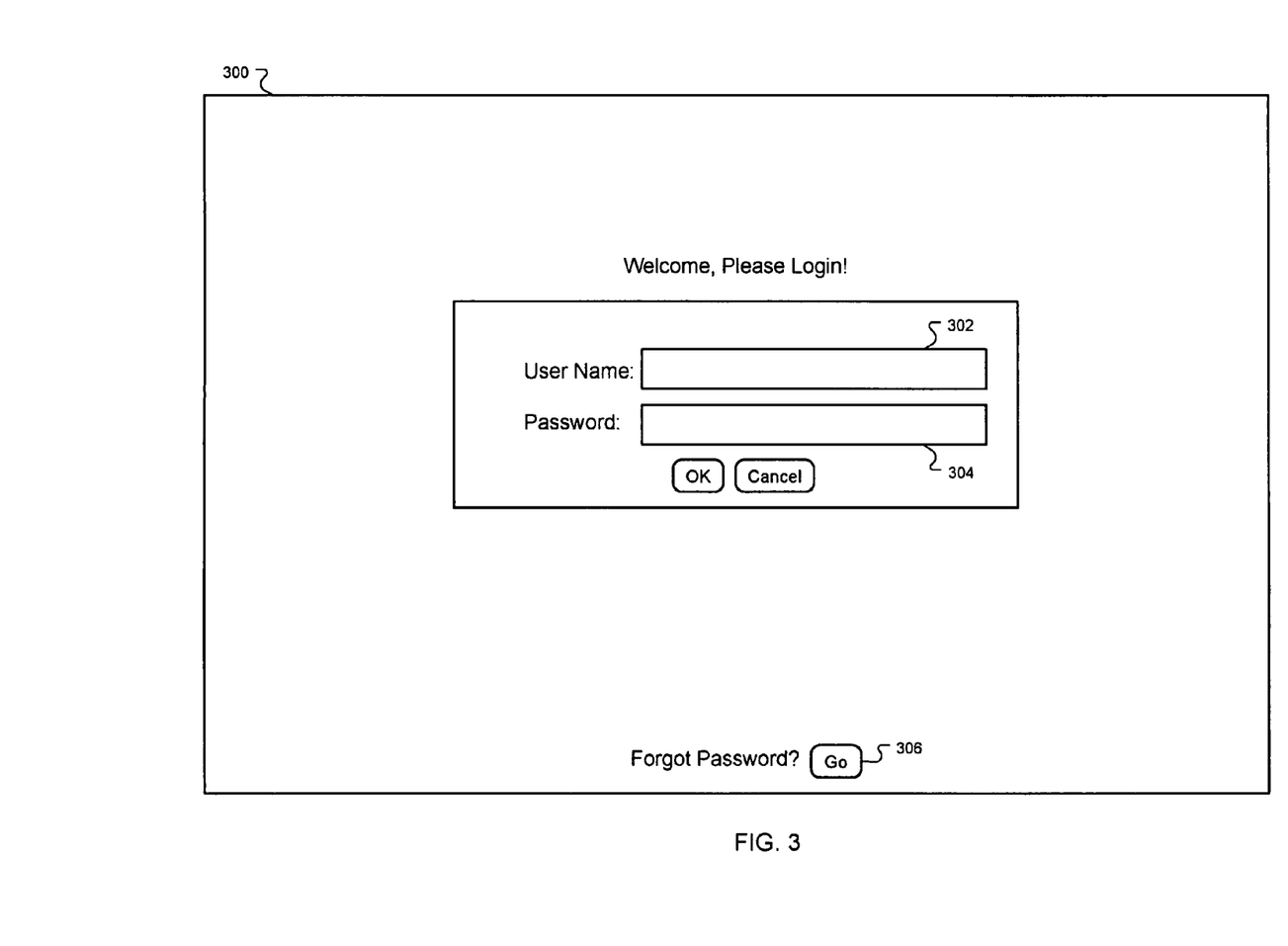
FIG. 3 is an example graphical user interface (GUI) for activating a password reset code module.

After a code module, such as the password reset code module 110A, has been registered with the client framework 126, it may be made available to a user of the client 104. FIG. 3 shows an example user interface 300 that the password interface module 110A may send for display to a display device of the I/O devices 134.

In this example, the interface 300 includes a login screen, sometimes referred to as a security desktop, provided by an operating system, such as the UNIX, Linux®, Mac OS®, or Windows® operating systems, for example. The interface 300 includes a user name input field 302 and a password input field 304. The user name input field 302 and the password input field 304 may be provided for authenticating a user to the operating system on the client 104. The fields 302 and 304 may allow the user to gain access to the computer, for example, to view files or run applications over the network 106.

In this example, the interface 300 also includes a password reset selection input control 306, which may be provided by the password reset code module 110A, for example. If the user has forgotten his or her password, the user may select the input control 306 to initiate the password reset process. The password reset code module 110A may perform operations to reset the user's password in cooperation with the server device 102. For example, the password reset process may include steps to verify the identity of the user by sending questions in the challenge-response database 140 for display (not shown) on the interface 300. In some implementations, the code module 110A can operate within the client framework 126 to enable a user who is not authenticated to the operating system on the client 104 to interact with the server 102 to verify the user's identity from the security desktop.

Figure 4:
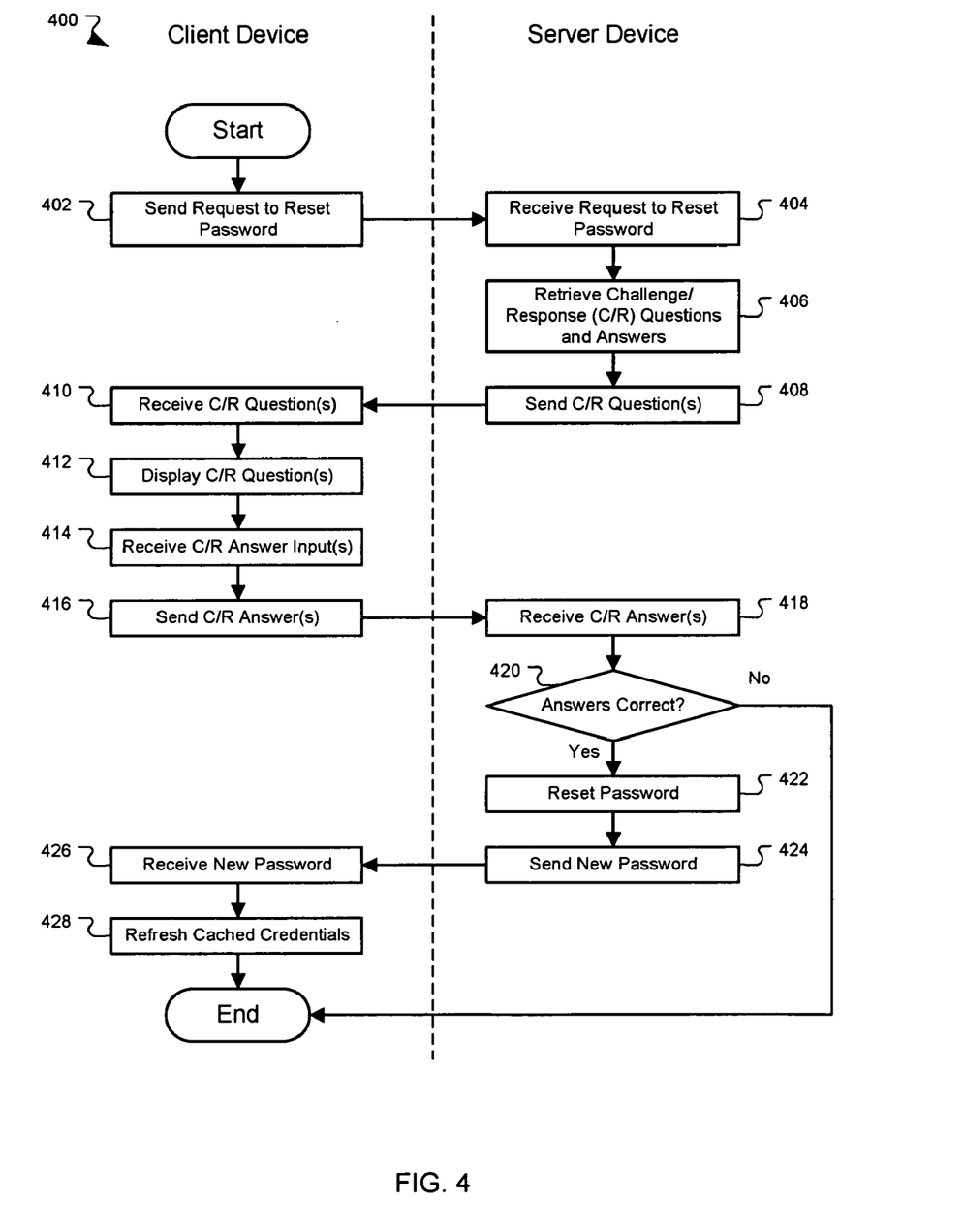
FIG. 4 is a flow chart showing example steps for resetting a password.

FIG. 4 shows a flowchart of an example method 400 to reset cached credentials on a client device, such as the cached credentials 154 on the remote client 104 described with reference to FIG. 1B. The method may be performed when a code module, such as one of the code modules 110 in the client 104, is registered in the client framework 126 and executed by the processor 132.

In this example, the code module may be activated by the client framework 126 at step 402 in response to a user sending a request to reset the password to the server 102 via the external network 152. The server 102 receives the request to reset the password at step 404, retrieves challenge-response questions and answers from the challenge response database 140 at step 406, and sends one or more of the questions to the client 104 at step 408.

At step 410, the client 104 receives the question(s), and the processor 132 sends the received question(s) for display on the I/O device 134 at step 412. Then, at step 414, the processor 132 receives answer(s) as user input(s), via keyboard, key pad, touch screen, mouse, touch pen or stylus, voice command, or other user input mechanism, and then sends the answer(s) at step 416.

At step 418, the server receives the answers sent by the client 104, and determines whether the answer(s) are correct at step 420. If the answer(s) are not correct, then the method 400 ends. However, if the answer(s) are correct, then the server 102 resets the user's password at step 422 and sends the new password to the client 104 at step 424. When the client 104 receives the new password at step 426, the code module 110 operates to refresh the cached credentials 154. The cached credentials may be refreshed, for example, by processes that may include manipulating pointers in the memory 130 of the client device 104. Then, the method 400 ends.

In other examples, the example method 400 may be modified, for example, by repeating steps including 408-420 more than once to provide multiple challenge questions and receive multiple answers.

In other implementations, other identification methods may supplement or be substituted for challenge response questions. For example, the code module may operate to transmit biometric data (e.g., voice print, thumb print, retinal scan) from the client 104 to the server for user verification. Hardware keys may be used in some implementations to verify the identity of a user and so that the server will send an authorization to the code module 110 to reset cached credentials.

Other implementations of the above methods may perform the steps in different sequence, or in a modified arrangement to achieve the same primary functions, which include providing a client framework to support a plurality of code modules, including code modules to permit an unauthenticated user to reset a password from a secure desktop, and/or to reset cached credentials on a remote client.

In some implementations, the client framework 126 may be configured to retain certain modules locally (e.g., on the local hard drive) at the client, for example, if the expected user or role of that user at that particular client workstation is well known. In some other implementations, the client framework 126 may retain certain identified code modules after an authenticated user logs out, but may restrict or deny access to some or all of the code modules to subsequent users of the client 104. In some other implementations, the client framework 126 may be configured to effectively render the previously loaded code modules inaccessible after an authenticated user logs out.

In various implementations, plug-in modules, range in application from Password Reset to Informational modules designed to communicate outages to the client. In one implementation, plug-ins to be download are determined, at least in part, by workstation demographic information. In various illustrative examples, demographic information may include a user's authorized role(s) (e.g., CFO, engineer, project manager, accountant). This allows the services to determine which plug-ins are appropriate for which client's workstation. This can provide a great deal of flexibility in some applications, and may increase the types and numbers of applications that can be delivered. For example, if a location has a limited available bandwidth (e.g., fractional T-1 line, ISDN or dial-up connection) that may be allocated to support framework service information (e.g., plug-in updates), then the plug-ins made available to that location may be limited in size, number, type, priority level, and/or maintenance interval.

In various implementations, an architecture for a service management framework (SMF) provides for services among at least one client and at least one server on a network. The SMF architecture is adaptable to provide distributed access that allows for servers to be distributed geographically. Such distributed access may reduce network impact and provide fast connectivity to the clients, for example, by allowing clients to connect to the closest server. While reducing network traffic, this architecture may provide inherent redundancy and load balancing capabilities in some implementations. In an example, the SMF infrastructure may include at least one server per geographical region (e.g., state, country, region) and a master server based on a continent such as, for example, North America.

The SMF Server may support web services to the SMF client, which may in turn provide the client with functionality to use Plug-In modules. The SMF may provide, for example, Cryptography, Logging, and Administration.

Plug-In Modules management functions may be handled by the SMF client, the SMF server, or both in combination. In some implementations, the SMF client may manage downloaded plug-ins, and may further only download newer versions when required. Newer versions may be pushed to clients, for example, upon identifying down level version when the server checks version status when the client initially contacts the server. If a new plug-in has been loaded into the library, for example, a schedule may define which individual, groups, or all clients will receive the update. In some embodiments, the updates may be automatically pushed to clients as clients contact the server, and/or by a specified time defined by an administrator. In other embodiments, updates may be pushed out to clients as bandwidth permits, or immediately (e.g., as quickly as practicable). The SMF server may manage all Plug-In modules via the code module library 108. The SMF server may also manage all plug-ins and only allow downloads when the SMF client meets the business logic associated with that plug-in.

When sending requests to the web service 112, the client may include machine identification information in the request. The client may then receive one or more plug-in modules and load them into memory to provide services to the client. The client may also be able to unload plug-in modules.

The server may provide the client framework 126 with a plug-in library of available services and the business logic for those service's distribution rules. The Plug-in library may interface and manage Plug-In modules via the interface provided by the Plug-In Framework. The SMF Server may interact with the Plug-In Library via its supplied interface.

The server side plug-in manager may provide access to the appropriate plug-in(s) in the plug-in library based on business rules managed through active directory groups, locations, organization units, or the like. The client may provide the workstation's identification as part of the request for plug-in(s) to the web service. A master server based in North America, for example, may be a single source of updates and may push updates to the remaining regional servers as required.

Encryption may be incorporated in various implementations. For example, the client may connect to the services via HTTPS, certificates may be required on each of the servers to allow for HTTPS: (SSL) level connections to at least some clients and/or authenticated users. In further implementations, the Plug-In modules may connect to services via HTTPS, and/or at least some data transferred among clients and/or servers may be double encrypted using one or more selected cryptography algorithms.

Plug-in authenticity may be established by CRC checking the downloaded modules against embedded CRCs. Each of the components should be able to validate itself to another component via an API call.

Some implementations may provide Version Control, which may include automated version control. For example, at least some client updates may be performed by the SMF Services. Each component may be updated at the time of initial connection. In particular, client updates may be performed by the SMF Web Service 112, and version updates may be performed at the server 102. Updates may be performed at times other than initial connection, such as at scheduled intervals and/or in response to a request from a user or an administrator.

Administration for the SMF may be provided, at least in part, by the SMF server which, in various implementations, may provide administration for the web services, Plug-in library, and Business logic for Plug-in distribution, for example.

The SMF client may feature scalability that provides substantial flexibility. Flexibility may be provided by self version control, by which the client may keep itself current. Flexibility may also be achieved by Plug-in modules that enable the client to add and remove functionality based on the services. Scalability may further be achieved through implementations having a distributed design. In a distributed design, for example, any practical number of clients may be added to the system by adding additional services servers as needed to distribute the load. Additional flexibility may be achieved by allowing the web services 112 to be easily expanded, and by making the database 122 simple to scale. Flexibility may also be achieved by Plug-ins which may give the client the ability to add and remove functionality based on the business logic.

In various implementations, the client framework 126 may have no user interaction; all user interaction may be handled by the plug-in(s). The SMF Plug-in may have user interaction via the Login desktop.

In some implementations, the SMF Server may have user interaction via the Administration console through an interface on the administration client device 105. Other interaction may be done directly with the SMF Client via a SMF client/server interface.

The SMF Client may be designed to run on various Windows platforms. Windows products are commercially available from Microsoft Corporation of Redmond, Wash. The SMF Client may also utilize minimal CPU resources.

The SMF Plug-In may be designed according to the Plug-In design specifications, the Plug-In framework may be capable of running on the Windows NT 4.0® platform (or above). The SMF Server may be designed to run on Windows 2000 Server™ (or above) platforms. Some implementations may operate other clients, servers, and operating systems, such as Linux, Solaris, or Mac OS®, for example.

Increasing calls to the helpdesk for password reset, status, and other issues continue to drive up the cost of delivering service. Various implementations described herein may significantly reduce the resources and expenses related to such support.

In some implementations, the concept of the framework provides a method of interacting with unauthenticated users from the Windows Security Desktop to provide access to functionality that would otherwise be un-available to a user until they logged-in to the client. The framework provides a flexible method for implementing services that may divert a substantial number of calls from the helpdesks while providing secure, robust services at a lower cost.

In some implementations, the client framework 126 is included in a client/server based solution that securely provides access to services that would normally only be available to a user who has authenticated to a client workstation. These services are available to the user from the Windows security desktop. The module loader 114 provides a secure shell in which to download and launch the latest set of plug-ins available on the server. The Loader module negotiates a secure session with the server to determine what modules are required. Then downloads the encrypted plug-ins, decrypts the plug-ins, checks their authenticity and loads the plug-ins into memory.

In some implementations, the Service Management Framework (SMF) client provides a method of interacting with unauthenticated users from the Windows Security Desktop. This client may provide access to functionality to a user who is not authenticated (i.e., logged-in) to the client workstation. The SMF client provides a flexible method of communicating with SMF management services that may allow network administrators, for example, to provide secure, robust services to the client that may reduce calls requesting support from a helpdesk.

The Service Management Framework (SMF) Plug-In may be developed using the SMF Plug-in Framework, which may provide easy access to the interfaces provided by the SMF for security, monitoring and loading/unloading Plug-In(s). The Plug-In Framework allows the SMF to look inside the Plug-In and actually control it.

In some implementations, substantially all SMF components may communicate using SSL layer encryption (e.g., HTTPS), and/or messages in formats such as XML may be encrypted.

In some implementations, the client service may include plug-in modules to parse messages in formats such as XML, HTML (or other formats or protocols, which may include custom message formats and/or protocols), provide its own version management, and/or update itself to the newest version when necessary. In further implementations, the client service may provide plug-ins to check the framework version, update the framework, and/or authenticate the framework by, for example, checking CRC information. In still further implementations, the client service may provide plug-in modules to load and execute the Framework, and/or to provide login desktop handles. In yet further implementations, the Client server may include plug-in modules to request and locally store primary and secondary URL's from the server for regional/local web server, and/or to collect and submit computer, domain, an IP information from local pc to a Web Service. In illustrative embodiments, computer information may be collected according to a schedule (e.g., hourly, daily, weekly, bi-monthly, etc. . . . ), and the collected information may be used to provide a snapshot to identify ways to improve system performance, utilization, etc. . . . , and forecast needs for updates, maintenance, and the like. For example, CPU utilization and available disk space may be monitored by a service that launches an application to clean and/or defragment a hard drive if certain predefined conditions or thresholds have been exceeded.

In some implementations, the client framework provides a security mechanism in conjunction with SSL (i.e., triple des encryption), and/or provide at least a minimal API for Plug-in developers to utilize the framework security and logging services. Security may be flexibly applied according to the security requirements for the network environment. For example, password resets and military communications may be configured to receive more robust encryption than routine communications in a typical commercial network environment.

In some implementations, a Plug-In Manager on the client may support the standard cryptography algorithm, be able to parse messages in XML (or other format), launch and manage plug-in(s) as required, provide a Thread Engine, monitor all Plug-in modules using the standard Plug-in framework monitoring API, provide the Identification of the local machine, and/or provide Local Logging.

In some implementations, a Plug-In Framework on the client may provide a standard API (application programming interface) for custom plug in development. For example, such an API may provide interfaces (and associated structure for passing data) for custom or canned plug-ins to perform functions such as monitoring (e.g., PC system information) and security (e.g., encryption, decryption information). In further implementations, the client plug-in framework includes support for the standard cryptography algorithm, and support for loading plug-in modules on multiple desktops. In some examples, a framework may provide error logging functions that can be accessed by custom plug in modules.

In some implementations, a Plug-In Library on the client may provide a Thread Engine to manage multiple requests, an interface to support interaction with the SMF, and a management module to manage the plug-ins and business logic associated with the plug-in modules, which business logic may provide rules to determine which clients get what plug-ins, for example.

In various implementations, the server framework is a solution that may securely provide the client framework with access to the plug-in library, via cryptography and secure hyper text transfer protocol (https), or other suitable transfer protocol. The server framework may distribute the plug-in(s) necessary for each client based on business logic.

In some implementations, the web service 112 may support various encryption algorithms, multiple plug-ins (e.g., in the code module library 108), and/or configurable business rules for plug-in distribution. In some further implementations, the web service 112 may integrate with active directory, log substantially all activity, which may include at least some network activity and/or at least some service management framework activity, and/or be able to parse XML, for example. In some further implementations, the Web service may provide primary and secondary URLs to a client upon request based on domain, subnet, and/or other criteria.

Some implementations may provide access to services or applications to unauthenticated users from the Windows Security Desktop (Login Screen). These services may vary in type, but would be accessible to the user prior to login to a workstation. A high degree of security may be achieved by implementing standard, proven encryption mechanisms—in combination with the use of randomly generated public and private keys along with SSL. This helps to ensure that valid plug-ins are downloaded and installed from the server.

In an illustrative example, an implementation may provide for an unauthenticated user at a client terminal to access services for which access is normally denied to users who are not unauthenticated to an operating system running on the client. For example, an unauthenticated user may communicate with the client, a server, or other resources (e.g., other clients, servers, gateways, etc. . . . ) available on a network. Unauthenticated users may normally be limited to interacting with a username/password interface on the login screen. In some embodiments, substantially no other services may be provided to an unauthenticated user who does not activate a plug-in module on a client framework.

In another illustrative example, an unauthenticated user at a login screen of a client device may make one or more user inputs that are received and processed by a service framework running on the client. In some cases, the framework may be configured to register one or more plug-in modules, which may be received from a server, for example. Some user inputs, such as a control sequence (e.g., ctrl-alt-key) or a user input to activate a user input control (e.g., radio button displayed on the login screen) may activate a selected plug-in module or service that is registered with the service framework running on that client. When activated by such user input, one or more plug-in modules may be activated from a secure desktop environment to provide access to certain services for which access is normally denied to unauthenticated users. The services may include processes that are run on the client, the server, or both in combination.

An example of a service that may be performed includes an audio input/output service, such as an audio interactive helpdesk, which may be automated and provide the unauthorized user with voice, music, alarms, or other audible information. Another example of a service that may be performed includes sending/receiving video information, which may be sent for display in part or all of a display device at the client. In some embodiments, voice and audio may be combined, and may provide one or two-way communication of audio and/or video content. For example, a suitably configured client device may be used to send and/or receive any available combination of text, graphics, video, and/or audio. User authentication information may be provided to a client and/or server. For example, voice print data, retinal or fingerprint images, and/or verbal data, may be sent for analysis and processing by recognition software running on the client, the server, or a combination of these.

Some implementations of the invention may be implemented in a computer system. For example, various implementations may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, clients and/or servers may communicate using suitable communication methods, equipment, and techniques. For example, the flash memory controller may send or receive messages over a bus and/or using point-to-point communication in which a message is transported directly from the source to the receiver over a dedicated physical link (e.g., fiber optic link, point-to-point wiring, and daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages, at least in part, over an air link by broadcasting to all or substantially all devices that are coupled together by one or more interconnected communication networks, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In some implementations, each of multiple clients or each of multiple servers, for example, may be programmed with substantially the same information and be initialized with substantially identical information stored in non-volatile memory. In other implementations, one or more clients and/or servers may be custom configured to perform specific functions. For example, one client device may be configured to perform client status checks and/or performance testing. Such testing may be performed at intervals (e.g., which may be user selected), or according to a regular maintenance schedule.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method to reset cached credentials on a remote client, the method comprising:
   receiving a request sent by a client device remote from a server to reset a password on the client device;
   sending a reply message to the client device over a network external to a network local to the server; and
   wherein the message prompts a plug-in module registered in a service framework running on the client device to perform operations to reset cached credentials on the client device in response to the received reply message;
   wherein the client device runs an operating system requiring authentication of a user to the client device, and the operating system has no authenticated users during the receiving and sending; and
   wherein the operations of receiving, sending, and resetting cached credentials are performed without user interaction.

2. The method of claim 1, further comprising resetting the password on the client device.

3. The method of claim 1, further comprising verifying the identity of the user.

4. The method of claim 3, wherein verifying the identity of the user comprises receiving answers to at least one challenge-response question.

5. The method of claim 1, wherein sending the reply message comprises sending the message through a firewall between the external network and the network local to the server.

6. The method of claim 1, further comprising sending updated plug-in modules from the server to be registered on the client service framework.

7. The method of claim 6, wherein sending updated plug-in modules comprises selecting modules based on a set of criteria.

8. The method of claim 7, wherein the set of criteria comprises an operating system running on the client device.

9. The method of claim 7, wherein the set of criteria comprises a role associated with a currently authorized user.

10. An apparatus to provide a framework for multiple services to run on a client terminal, the apparatus comprising:
   a processor in a client device that runs an operating system requiring authentication of a user to the client device; and
   a memory in the client device containing instructions that, when executed by the processor, cause operations to be performed, the operations comprising:
      registering at least one of a plurality of plug-in modules received from a server with a service framework running on the client;
      selecting a registered plug-in module on the client device to activate in response to a request to reset a password received when the operating system running on the processor has no authenticated users; and
      activating the selected plug-in module upon receiving the request when the operating system running on the processor has no authenticated users, wherein the plug-in module is configured to without user interaction:
         send a request to reset the password to the server;
         receive a reply message from the server; and
         reset the password responsive to the received reply.

11. The apparatus of claim 10, wherein the operations further comprise receiving updated plug-in modules from the server.

12. The apparatus of claim 11, wherein the operations further comprise registering the updated plug-in modules with the service framework.

13. The apparatus of claim 10, wherein the operations further comprise resetting cached credentials on the client.

14. The apparatus of claim 10, wherein the client comprises a laptop or notebook or handheld computer.

15. A machine-readable storage device comprising machine-readable instructions that, when executed, cause operations to be performed, the operations comprising:
   receiving user input to request a password reset at a client when the client runs an operating system, the operating system requires user authentication, and the operating system is without a currently authenticated user;
   processing the received user input by activating a first service module registered in a service framework on the client configured to register one or more service modules;
   sending information about the received user input from the client to a server; and
   receiving information from the server regarding whether to reset the password; and
   resetting the password based on the information received;
   wherein the operations occur while the operating system is without a currently authenticated user; and
   wherein the operations of sending information, receiving information, and resetting the password are performed without user interaction.

16. The machine-readable storage device of claim 15, wherein the operations further comprise resetting the password.

17. The machine-readable storage device of claim 15, wherein the information received from the server comprises a denial of the request.

18. The machine-readable storage device of claim 15, wherein the operations further comprise verifying the user's identity.

19. The machine-readable storage device of claim 15, wherein the operations further comprise resetting cached credentials on the client.

20. The machine-readable storage device of claim 15, wherein the operations further comprise causing information to be sent for display, the sent information comprising a message indicating successful reset of the password.

21. The machine-readable storage device of claim 20, wherein the operations further comprise displaying the message in conjunction with a login screen.

22. A system to provide a framework to run services on a client-server network without an authenticated user, the apparatus comprising:
   a server;
   a client coupled to communicate data with the server over a communication path, the client comprising:
      a client processor that runs an operating system requiring authentication of a user to the client; and
      a memory containing instructions that, when executed by the client processor, cause operations to be performed, the operations comprising:
         registering at least one of a plurality of plug-in modules and updated plug-in modules received from a server with a service framework running on the client;
         selecting a registered plug-in module to activate in response to receiving a user input when no users are authenticated to the operating system; and
         activating the selected plug-in module upon receiving the user input when the operating system has no authenticated users, wherein the selected plug-in module provides access to services for which access is denied to users who have not authenticated to the operating system;
      wherein the server is configured to select the updated plug-in modules based on a set of criteria comprising an operating system running on the client.

23. The system of claim 22, wherein the selected plug-in module provides access to services running on the server.

24. The system of claim 22, wherein the selected plug-in module provides access to services running on the client.

25. The system of claim 22, wherein the selected plug-in module provides access to services running on another client or another server coupled to communicate with client processor.

26. The system of claim 22, wherein the services to which the selected plug-in provides access comprise a password reset service.

27. The system of claim 22, wherein the services to which the selected plug-in provides access comprise a cached credentials reset service.

* * * * *

UNITED STATES PATENT AND TRADEMARK OFFICE
CERTIFICATE OF CORRECTION

| | | |
|---|---|---|
| PATENT NO. | : 7,930,735 B2 | Page 1 of 1 |
| APPLICATION NO. | : 11/394905 | |
| DATED | : April 19, 2011 | |
| INVENTOR(S) | : George Vigelette et al. | |

It is certified that error appears in the above-identified patent and that said Letters Patent is hereby corrected as shown below:

In column 15, line 56, in Claim 15, delete "the password;" and insert -- the user's password --, therefor.

Signed and Sealed this
Thirtieth Day of August, 2011

David J. Kappos
*Director of the United States Patent and Trademark Office*